United States Patent [19]

Prisco

[11] Patent Number: 4,709,415
[45] Date of Patent: Nov. 24, 1987

[54] T-CARRIER FIBER OPTIC MODEM

[75] Inventor: John J. Prisco, West Chester, Pa.

[73] Assignee: Warner Cable Communications, Inc., New York, N.Y.

[21] Appl. No.: 930,456

[22] Filed: Nov. 14, 1986

[51] Int. Cl.$^4$ ................................. H04B 9/00
[52] U.S. Cl. ................... 455/607; 455/600; 455/601; 455/612
[58] Field of Search .............. 370/4, 75, 97; 375/7, 375/8; 455/607, 600, 601, 606, 612, 608

[56] References Cited

FOREIGN PATENT DOCUMENTS 59-186437 10/1984 Japan .................................. 455/612

Primary Examiner—Robert L. Griffin
Assistant Examiner—L. Van Beek
Attorney, Agent, or Firm—Gottlieb, Rackman & Reisman

[57] ABSTRACT

A T-carrier fiber optic modem for a telephone central office which allows simple conversion from electrical to optical transmission. An unused slot in a T-carrier span terminating shelf is provided with one optical transmitter/receiver pair for each of the T1 cards in the same shelf. All of the optical fibers are contained in ribbon cables which are connected to this "new" card, with a minimum number of electrical connections being made between the new card and the T1 cards. A minor change in each of the T1 cards "fools" it into thinking that the necessary DC supervisory potential appears on the two receive pins previously connected to a copper twisted-pair cable.

8 Claims, 8 Drawing Figures

OPTICAL TRANSMITTER

OPTICAL RECEIVER

T-CARRIER FIBER OPTIC MODEM

DESCRIPTION

This invention relates to T-carrier signal transmission via optical fibers, and more particularly to the conversion of existing telephone central offices to optical fiber transmission.

The transmission of T-carrier signals on copper twisted-pair cable has long been the conventional technique used in local loops. [The term "T-carrier" as used herein includes the equivalent T1 and DS1 schemes, T1C, T2, T3 and comparable digital schemes defined in the North American Digital Hierarchy.] When intermediate distribution distances are involved, however, reliability problems are encountered because of the large numbers of repeaters required in the span. Also, even the best copper cable introduces high attenuation and crosstalk.

It would be far preferable to transmit T-carrier signals in the local loop using optical fibers. This requires a T-carrier optical modem at each terminal end. The modem is essentially a group of optical transmitters and optical receivers, with enough bandwidth to be transparent to T-carrier signals. The technology for making optical modems and interfacing them with optical fibers exists. The problem, however, is that there has been no practical way to convert the existing telephone central offices to optical fiber transmission without adding banks of equipment and cables. Even if each building is expanded to accommodate the additional circuitry and cables which would be required, unless the existing racks are re-distributed there would be a jungle of cables all over the place.

It is a general object of my invention to provide a relatively inexpensive and "clean" modification of an existing telephone central office for converting T-carrier copper twisted-pair cable transmission to optical fiber transmission.

In a typical telephone central office there are racks with removable circuit cards. Each rack usually has thirteen slots and is called a "T1 span terminating shelf." Usually only twelve cards are placed in the rack, each card handling one T1 signal. [References throughout this description to T1-carrier signals are illustrative only, it being understood that the invention embraces all T-carrier and equivalent systems.] The thirteenth slot is usually not used so that access may be had to the motherboard for test purposes from the front as well as the back. As will be described, in my invention the thirteenth slot is used to provide optical transmitters and receivers for the circuit cards contained in the other twelve slots. The card of my invention has twelve optical transmitters and twelve optical receivers, and thus can handle an entire shelf of T1 cards. The invention is not limited, however, to the conversion of central offices whose span terminating shelves have empty slots. The invention is applicable even to a twelve-slot shelf, for example, if one of the present T1 repeater cards is removed. In this case, the card of my invention would allow only eleven T1 carrier signals to be transmitted over optical fibers.

There are standard T1 cards made by many manufacturers; all of them operate in the same way. No T1 card will receive data unless it senses DC potentials on its two receive input pins. Because there is no DC signal which flows in an optical fiber, it might appear that the conversion contemplated by my invention is not feasible. However, as will be described in detail below, each T1 card can be "fooled" into thinking that there is a DC receive potential simply by adding a single resistor to the card.

Further objects, features and advantages of my invention will become apparent upon consideration of the following detailed description in conjunction with the drawing, in which.

Figure 1:
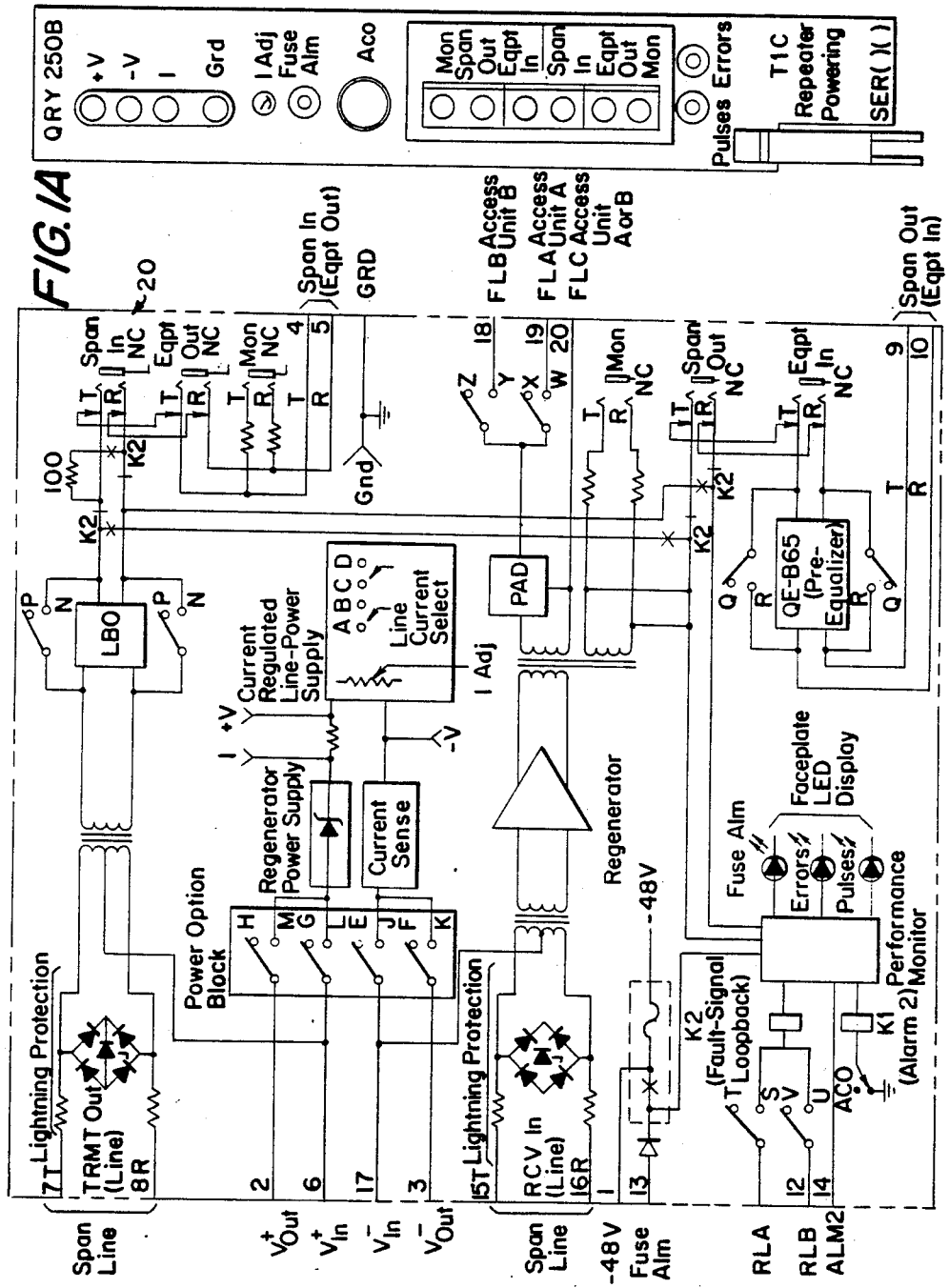
FIG. 1A is a functional block diagram of a conventional T1 circuit card and FIG. 1B is a front view of the same card.

The T1 card of FIGS. 1A and 1B has been copied from a schematic of Northern Telecom Limited, a well-known manufacturer of telephone equipment. The card functions as an office repeater in T1/T1C systems. As far as the present invention is concerned, there are only four pins of interest—7 and 8, and 15 and 16. Pins 7 and 8 are connected to the two wires of a receive wire pair. The card operates in a full duplex mode, and transmits and receives bipolar bit streams which meet AT&T Technical Advisory 34 Standards. The regenerator section of the card normally receives power only when a DC potential appears on pins 15 and 16. This potential is extended to the current sense circuit which then causes the regenerator to be powered. When twisted-pair cable is replaced with optical fiber, it is no longer possible to power the office repeater card this way. For this reason, each card must be modified to deliver power to its regenerator.

Figure 3:
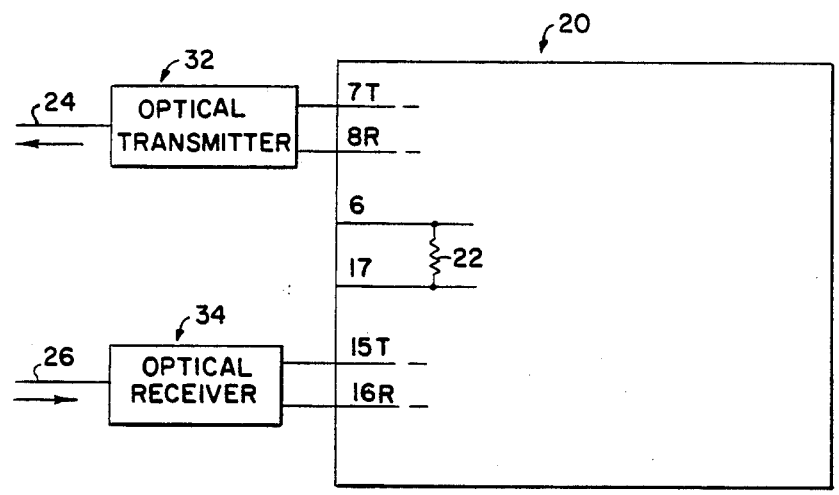
FIG. 3 illustrates the manner in which the T1 card of FIG. 1A is modified and connected to an optical transmitter and an optical receiver, it being understood that FIG. 3 depicts the circuitry involved without focusing on the location of the optical transmitter and optical receiver.

Referring to FIG. 1A, it will be seen that a DC potential source is applied to pin 6 and the potential is normally extended from pins 7 and 8, via a twisted-pair cable, to pins 15 and 16 of a remote, connected T1 repeater card. To "fool" a repeater card into thinking that a DC potential is being received from a remote card, the potential at pin 6 is coupled to pin 17, which is in turn connected to the current sense circuit. Referring to FIG. 3, it will be seen that circuit card 20 is modified by placing a resistor 22 (25 kilohm, ½-watt) between pins 6 and 17. This is all that is necessary to extend power to the regenerator.

Figure 2:
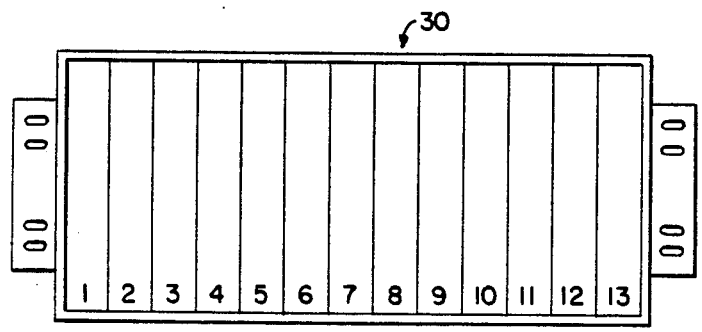
FIG. 2 depicts a T1 span terminating shelf.

The T1 span terminating shelf of FIG. 2 includes thirteen slots. Usually only twelve of them have T1 cards. The thirteenth slot can be used, for example, for test purposes, giving access to the motherboard from the front of the rack.

It has already been described how the circuit card itself is modified with the addition of a resistor 22, as shown on FIG. 3. FIG. 3 also shows the two wires of the transmit section of the card being extended to optical transmitter 32, the optical transmitter operating to generate an optical signal on fiber 24. Similarly, an optical signal on fiber 26 results in optical receiver 34 generating a receive signal which is applied to pins 15 and 16 of the receive section of the card. FIG. 3 does not depict where the transmitter/receiver pair for each card is located. That will be discussed with reference to FIGS. 6A and 6B.

Figure 4:
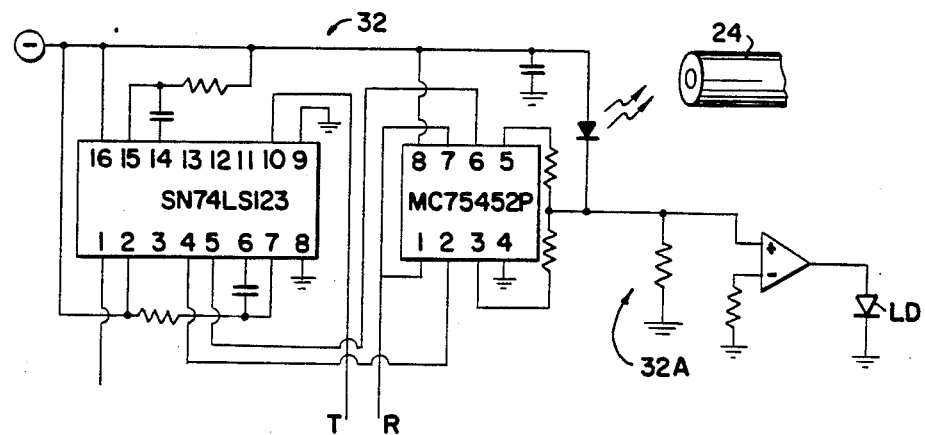
FIG. 4 is an electrical schematic of an optical transmitter.
Figure 5:
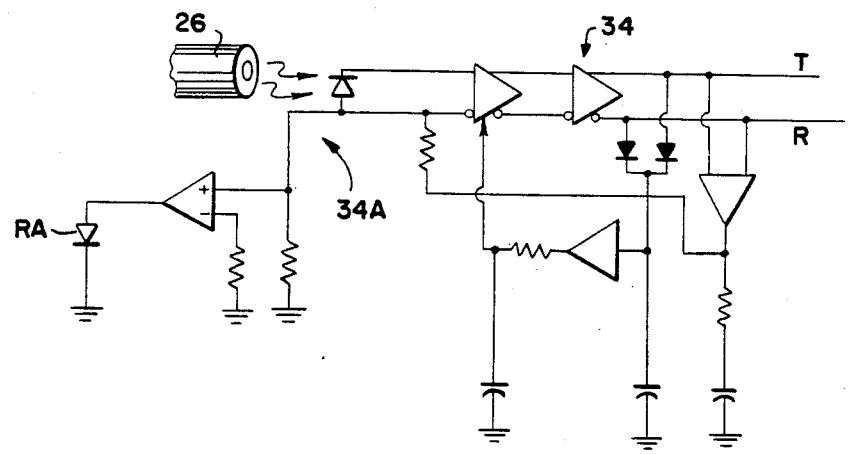
FIG. 5 is an electrical schematic of an optical receiver.
Figures 6A, 6B:
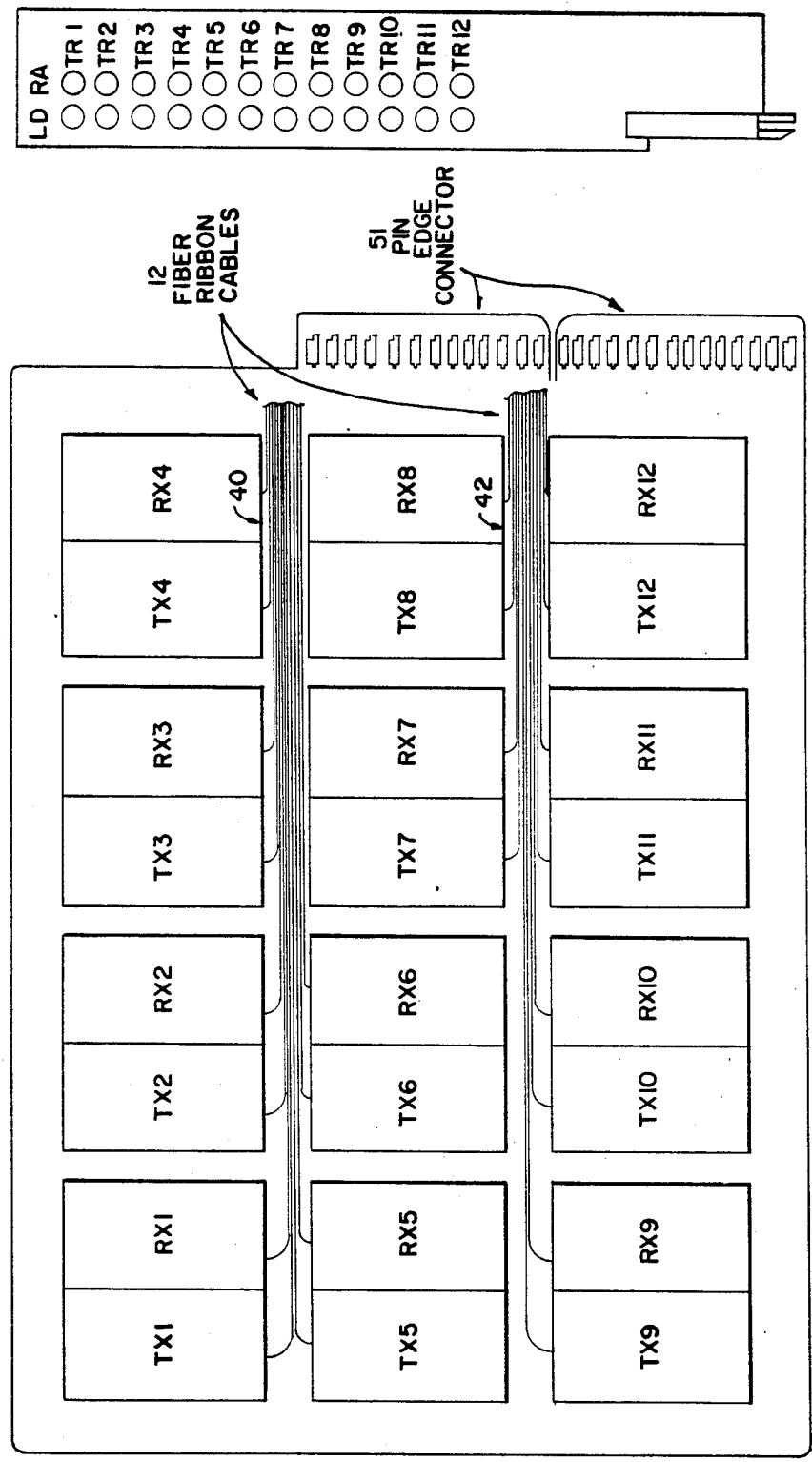
FIGS. 6A and 6B depict topological and front views of the circuit card of my invention which provides the interface between the existing T1 card in the span terminating shelf and the optical fibers over which the transmission takes place.

Before considering the card of. my invention which is depicted in FIGS. 6A and 6B, it will be helpful to consider the optical transmitter 32 of FIG. 4 and the optical receiver 34 of FIG. 5. The optical transmitter is conventional in all respects except for the addition of the elements to the right of arrow 32A. The electrical signal which is to be converted to an optical signal is transmitted along fiber 24. The elements to the right of arrow 32A comprise a simple circuit for, causing light-emitting-diode LD to be illuminated when the current through the laser diode in the optical transmitter is less than a threshold value. The illumination of the LD diode represents "laser degradation."

The optical receiver 34 of FIG. 5 is similarly conventional in every respect except for the circuitry to the left of arrow 34A. An optical signal appearing on fiber 26 results in an electrical signal on wires T, R. In the absence of receiver activity, light-emitting-diode RA is turned on. The two light-emitting-diodes LD and RA are sufficient to advise service personnel of the status of the associated T1 carrier card.

The card of FIGS. 6A and FIG. 6B, normally inserted in the thirteenth slot of each T1 span terminating shelf, is organized such that it contains the optical transmitter and optical receiver associated with each of the other twelve cards. The notation used in FIG. 6A for an optical transmitter is TX and the notation RX is used to indicate the associated optical receiver. For example, optical transmitter TX8 and optical receiver RX8 are associated with the eighth T1 carrier card. Referring to FIG. 3, it is apparent that four wires must be extended between each T1 card and the card of FIG. 6A. Thus a total of 48 electrical connections must be made between the twelve existing cards and the new one to be added. In addition, three other electrical connections are required for powering the new card—V+, V− and neutral connections. It is for this reason that the card of FIG. 6A is provided with a 51-pin edge connector as shown.

The electrical connections from the thirteenth card to the existing twelve are made via the motherboard in back of the shelf, or via a wire harness.

There are 24 optical fibers which must be connected to the card of FIG. 6A; for each of the twelve transmitter/receiver pairs, there are two optical fibers as is apparent from FIGS. 4 and 5. Two fiber ribbon cables are provided for this purpose, each cable containing twelve fibers. The optical transmitters and receivers are arranged in three rows on the card, and thus it is convenient to lay the two cables between adjacent rows of modules. Cable 40 contains two fibers which are connected to each of the four transmitter/receiver pairs in the top row and two of the four pairs in the middle row. The twelve fibers in ribbon cable 42 are connected to the two remaining transmitter/receiver pairs in the middle row, and to the four transmitter/receiver pairs in the bottom row. The front of the thirteenth card, shown in FIG. 6B, contains the twelve LD/RA light-emitting-diode pairs, one pair (Transmit and Receive) for each of the other twelve T1 cards.

It is apparent that the invention allows the convenient and inexpensive construction of full duplex T-carrier links on fiber at a fraction of the cost of prior methods. The T-carrier fiber optic modem of the invention provides reliable, repeaterless operation in the telephone local loop without giving rise to cluttering of existing central offices or a total rearrangement of the banks of equipment which they now contain.

Although the invention has been described with reference to a particular embodiment it is to be understood that this embodiment is merely illustrative of the application of the principles of the invention. Numerous modifications may be made therein and other arrangements may be devised without departing from the spirit and scope of the invention.

I claim:

1. A T-carrier fiber optic modem comprising a T-carrier span terminating shelf having thirteen slots; twelve T-carrier office repeater cards being disposed in respective ones of said slots; each of said T-carrier repeater cards having a pair of transmit output terminals and a pair of receive input terminals; a thirteenth card disposed in the thirteenth slot of said T-carrier span terminating shelf; said thirteenth card having twelve optical transmitters and twelve optical receivers; and a wiring pattern in said T-carrier span terminating shelf for connecting each of the twelve pairs of transmit output terminals to a respective one of said twelve optical transmitters and for connecting each of the twelve pairs of receive input terminals to a respective one of said twelve optical receivers.

2. A T-carrier fiber optic modem in accordance with claim 1 wherein each of said T-carrier office repeater cards includes means for applying a DC potential to said output terminals, means for sensing a DC potential on said input terminals derived from a remote location, and means responsive to sensing of a DC potential for allowing full powering of the repeater card; and means for applying a DC potential on all of said input terminal pairs for simulating a DC potential derived from a remote location.

3. A T-carrier fiber optic modem in accordance with claim 1 wherein the front of said thirteenth card includes twelve pairs of indicators, a respective pair for each of said twelve repeater cards; means for controlling one indicator of each pair in accordance with the operation of the optical transmitter connected to the respective repeater card; and means for controlling the other indicator of each pair in accordance with the operation of the optical receiver connected to the respective repeater card.

4. A T-carrier fiber optic modem in accordance with claim 1 wherein all of said optical transmitters and optical receivers are arranged in three rows on said thirteenth card; and further including a plurality of optical fibers, each connected to a respective optical transmitter or receiver; said plurality of optical fibers being arranged in two groups disposed respectively between adjacent ones of said three rows.

5. A T-carrier fiber optic modem comprising a T-carrier rack having N slots; M T-carrier office repeater cards being disposed in M respective slots, where M is less than N; each of said T-carrier repeater cards having a pair of transmit output terminals and a pair of receive input terminals; an additional card disposed in one of the remaining (N-M) slots of said rack; said additional card having M optical transmitters and M optical receivers; and a wiring pattern in said rack for connecting each of the M pairs of transmit output terminals to a respective one of said M optical transmitters and for connecting each of the M pairs of receive input terminals to a respective one of said M optical receivers.

6. A T-carrier fiber optic modem in accordance with claim 5 wherein each of said T-carrier office repeater cards includes means for sensing a DC potential on said input terminals derived from a remote location, and means responsive to sensing of a DC potential for allowing full powering of the repeater card; and means for applying a DC potential on all of said input terminal pairs for simulating a DC potential derived from a remote location.

7. A T-carrier fiber optic modem in accordance with claim 5 wherein the front of said additional card includes M pairs of indicators, a respective pair for each of said M repeater cards; means for controlling one indicator of each pair in accordance with the operation of the optical transmitter connected to the respective repeater card; and means for controlling the other indicator of each pair in accordance with the operation of the optical receiver connected to the respective repeater card.

8. A T-carrier fiber optic modem in accordance with claim 5 wherein all of said optical transmitters and optical receivers are arranged in three rows on said additional card; and further including a plurality of optical fibers, each connected to a respective optical transmitter or receiver; said plurality of optical fibers being arranged in two groups disposed respectively between adjacent ones of said three rows.

* * * * *